United States Patent
Chang

(10) Patent No.: US 8,724,195 B2
(45) Date of Patent: May 13, 2014

(54) ACCOMMODATING DYNAMIC RANGES IN A CONE SPACE MODEL

(75) Inventor: Michael M. Chang, Redondo Beach, CA (US)

(73) Assignee: KYOCERA Document Solutions Inc. (JP)

(*) Notice: Subject to any disclaimer, the term of this patent is extended or adjusted under 35 U.S.C. 154(b) by 120 days.

(21) Appl. No.: 13/444,599

(22) Filed: Apr. 11, 2012

(65) Prior Publication Data

US 2013/0271775 A1 Oct. 17, 2013

(51) Int. Cl.
*G06K 1/00* (2006.01)
*G03F 3/08* (2006.01)

(52) U.S. Cl.
USPC .................................... 358/518; 358/1.9

(58) Field of Classification Search
USPC ........... 358/2.1, 1.9, 3.22; 382/162, 167, 274, 382/294, 300, 278; 345/603
See application file for complete search history.

(56) References Cited

U.S. PATENT DOCUMENTS

| | | | |
|---|---|---|---|
| 4,758,885 A | 7/1988 | Sasaki et al. | |
| 7,760,406 B2 * | 7/2010 | Shigeta | 358/518 |
| 2006/0104508 A1 | 5/2006 | Daly et al. | |
| 2008/0055476 A1 | 3/2008 | Shehata et al. | |
| 2010/0165137 A1 * | 7/2010 | Koishi | 348/222.1 |

FOREIGN PATENT DOCUMENTS

| | | |
|---|---|---|
| EP | 1009161 A2 | 6/2000 |
| WO | 2010083493 A1 | 7/2010 |
| WO | 2011064207 A1 | 6/2011 |

OTHER PUBLICATIONS

H. Boll, Black-point Compensation: theory and application, ICC White Paper #40, Level: Intermediate, pp. 1-14, circa Jan. 2011.
International Color Consortium, Members Only Area—Current Activities, "Profile Connection Space (PCS)" excerpt taken Apr. 12, 2012, available online at www.color.org.
Berns, Roy S. et al., Cathode-Ray-Tube to Reflection-Print Matching Under Mixed Chromatic Adaptation Using Rlab, Journal of Electronic Imaging, vol. 4, No. 4, pp. 347-359 (Oct. 1995), Bellingham, WA.
Stone, Maureen C., et al., Color Gamut Mapping and the Printing of Digital Color Images, ACM Transactions on Graphics, vol. 7, No. 4, pp. 249-292, Oct. 1988.
Yamasaki, Toru et al., Color Interchange Mechanism Considering Color Adaptation and Gamut Mapping, Journal of Electronic Imaging, vol. 2, No. 3, pp. 237-244, Jul. 1993.
European Search Report for App. No. EP 13163276.2, mailed Jul. 29, 2013.

(Continued)

*Primary Examiner* — Barbara Reinier
(74) *Attorney, Agent, or Firm* — McDonnell Boehnen Hulbert & Berghoff LLP

(57) ABSTRACT

Methods and systems for accommodating color ranges are provided. A source light-to-dark dynamic range of a first output medium may be obtained with a source white point and a source black point. A destination light-to-dark dynamic range of a second output medium may be obtained with a destination white point and a destination black point. A white point mapping and a black point mapping may be determined. Based on a first representation of an image on the first output medium, a second representation of the image may be created by interpolating the source light-to-dark dynamic range to the destination light-to-dark dynamic range based on the white point mapping and the black point mapping. A computing device may cause the second output medium to produce the representation of the image.

14 Claims, 8 Drawing Sheets

(56) References Cited

OTHER PUBLICATIONS

R.W.G. Hunt & M.R. Pointer, Measuring Color, 4th Ed., Chapter 2, Wiley, Chichester, England 2011.

M.D. Fairchild, Color Appearance Models, Chaps. 8 & 9, Wiley, Chichester, England, 2005.

Postscript Language Reference Manual, Adobe Systems, 3rd ed., Chap. 7, Addison-Wesley, New York, New York, 1999, available online at http://www-cdf.fnal.gov/offline/PostScript/PLRM3.pdf.

Adobe Systems Implementation of Black Point Compensation, Adobe Systems, available online at http://www.color.org, 2006.

Marti Maria, How to Use the Engine in Your Applications, Little CMS Tutorial, available online at http://www.littlecms.com, 2011.

Marti Maria, cmsps2.c source code, available online at http://www.littlecms.com, 2012.

International Color Consortium, Making Color Seamless Between Devices and Documents, available online at http://www.color.org, Apr. 2012.

ICC Profile Specifications, ICC.1:Dec. 2010, Appendix D, pp. i-53, available online at http://www.color.org.

ICC Profile Specifications, ICC.1:Dec. 2010, Appendix D, pp. 54-114, available online at http://www.color.org.

\* cited by examiner

ACCOMMODATING DYNAMIC RANGES IN A CONE SPACE MODEL

BACKGROUND

Converting color from a first representation of an image to a second representation of the image, such as an image forming device (e.g., color printer), may be challenging. For example, a first representation of color on computer monitors may be displayed using red, green, and blue (RGB) pixels, while most modern color printers display colors using cyan, magenta, yellow, and black (CMYK) ink or toners. In some cases, the color quality reproduced by the color printer may be evaluated based on how close the printed colors are to the colors originally shown on the monitor. In other cases, the color quality may be evaluated based on preferences of the user, such as preferences toward particular skin tones, for example. Further, color quality may depend on a particular color gamut, which may vary from device to device.

SUMMARY

Various embodiments set forth herein provide ways of reproducing colors, possibly from a first output medium to a second output medium. These embodiments are provided herein for purposes of illustration and are not meant to be limiting in any way.

In accordance with one example, a source light-to-dark dynamic range of a first output medium may be obtained, where the source light-to-dark dynamic range includes a source white point and a source black point. In addition, a destination light-to-dark dynamic range of a second output medium may be obtained, where the destination light-to-dark dynamic range includes a destination white point and a destination black point. Further, a white point mapping may be determined using the source white point and the destination white point, and a black point mapping may be determined using the source black point and the destination black point. Yet further, a first representation of an image may be displayed on the first output medium. Based on the first representation, a second representation of the image may be created by interpolating the source light-to-dark dynamic range to the destination light-to-dark dynamic range based on the white point mapping and the black point mapping. In addition, a computing device may cause the second output medium to produce the second representation of the image using the destination light-to-dark dynamic range.

These as well as other aspects and advantages will become apparent to those of ordinary skill in the art by reading the following detailed description with reference where appropriate to the accompanying drawings.

DETAILED DESCRIPTION

Figure 1:
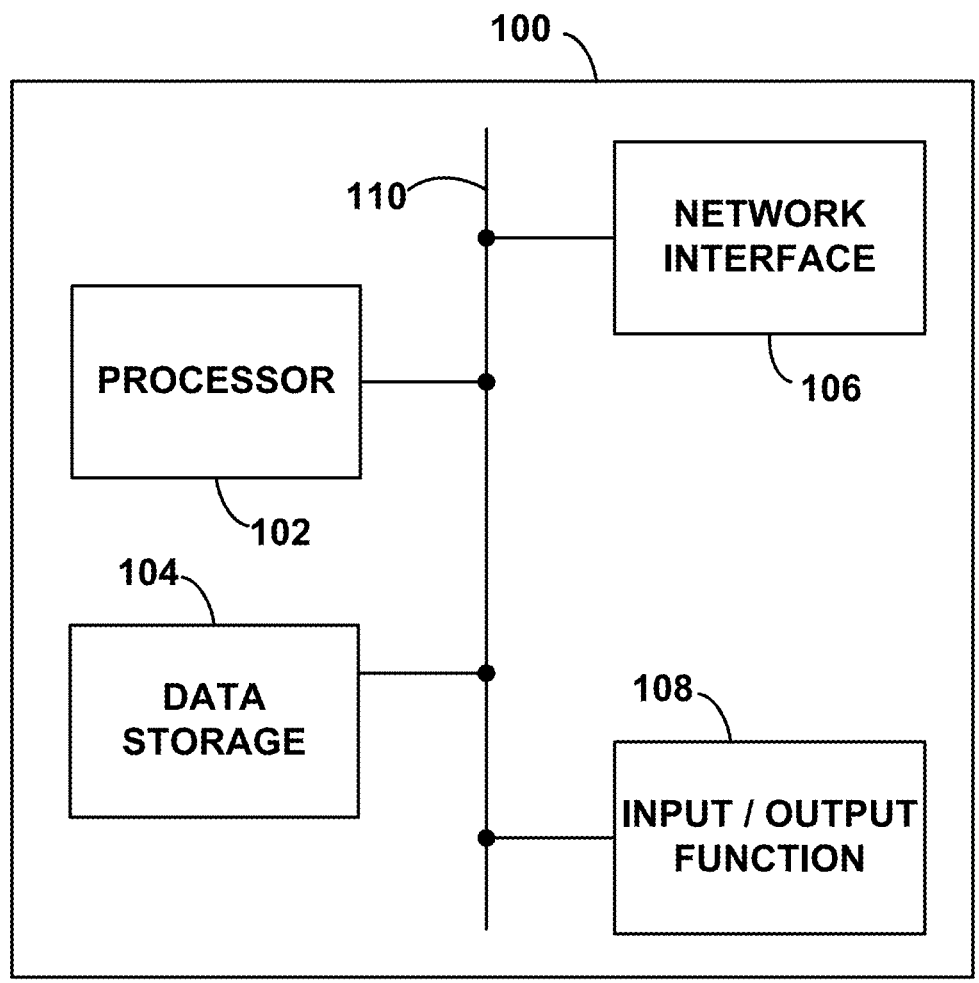
FIG. 1 is a block diagram illustrating a computing device, according to an example embodiment.

Example methods and systems are described herein. Other example embodiments or features may further be utilized, and other changes may be made, without departing from the spirit or scope of the subject matter presented herein. In the following detailed description, reference is made to the accompanying figures, which form a part thereof. In the figures, similar symbols typically identify similar components, unless context dictates otherwise.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

Color printers capable of printing colored images have gained popularity. However, printers may reproduce colors differently on paper than how the colors may appear elsewhere, such as on a computer monitor. In some instances, printers may print images in a certain way even though the image data, possibly in a lossy format such as JPEG, may indicate otherwise. Other image data may involve graphic formats such as TIFF, GIFF, PNG, BMP, and/or a raw image format, amongst other possibilities. In many respects, differences between the image's light-to-dark dynamic range and the printer's light-to-dark dynamic range may result in low quality prints. For example, color reproduction may be restricted by the device with the smallest light-to-dark dynamic range (e.g., the printer's light-to-dark dynamic range).

Further, printers generally may not reproduce colors while accommodating for human visualization. In particular, printers may not take into account how an image is visually perceived on paper versus other ways of viewing the image, such as on a computer monitor. In practice, objects may be viewed differently under varying conditions (e.g., by a projector versus on printed paper, under sunlight versus a harsh electric light, etc.) and human vision may perceive such objects differently based on such conditions. Therefore, it is preferable to reproduce colors while utilizing light-to-dark dynamic ranges that accommodate for the human eye and its responses to colors under certain conditions.

Accordingly, example embodiments herein may involve systems and methods for accommodating light-to-dark dynamic ranges with respect to human visualization. A light-to-dark dynamic range may be analyzed in a color space to represent colors in numerical values. In some embodiments, some color spaces may represent the responses of the human eye. In particular, some color spaces represent "cones," which are photoreceptor cells in the retina of the human eye that provide for color vision. Therefore, a "cone space model" should be understood to involve a color space representing responses of the human eye.

As such, a light-to-dark dynamic range may be converted into a set of values in the cone space model. For example, a computer monitor may display colors in red, green, and blue (RGB) pixels and these colors may be converted into corresponding parameters in the cone space model. Further, colors such as cyan, magenta, yellow, and black (CMYK) may be used by a printer and may also be converted into parameters in the cone space model. In the cone space model, the light-to-dark dynamic range of an image may be mapped to the light-to-dark dynamic range of the printer. Further, these mappings can be used to take colors from the image, identify the respective colors available with the printer, and reproduce images on paper. In addition, the image may be reproduced while accommodating responses of the human eye. In particular, a person viewing the image on printed paper may perceive the colors in the same way or similar to viewing the image on a computer monitor.

B. Example Computing Device

In some embodiments, an example computing device may be helpful to understand aspects of the disclosure herein. FIG. 1 is a block diagram illustrating a computing device, according to an example embodiment. Computing device 100 illustrates one or more of the functional elements that may be found in a device arranged to operate in accordance with the embodiments herein.

Computing device 100 may include a processor 102, data storage 104, network interface 106, and input/output function 108, all of which may be coupled by a system bus 110 or a similar mechanism. Processor 102 may include one or more central processing units (CPUs), such as one or more general purpose processors and/or one or more dedicated processors (e.g., application specific integrated circuits also known as ASICs or digital signal processors also known as DSPs, etc.).

Data storage 104, in turn, may comprise volatile and/or non-volatile data storage and can be integrated in whole or in part with processor 102. Data storage 104 may store program instructions, executable by processor 102, and data that are manipulated by these instructions to carry out the various methods, processes, or functions described herein. Alternatively, these methods, processes, or functions can be defined by hardware, firmware, and/or any combination of hardware, firmware and software. Therefore, data storage 104 may include a tangible, non-transitory computer-readable medium, having stored thereon program instructions that, upon execution by one or more processors, cause computing device 100 to carry out any of the methods, processes, or functions disclosed in this specification or the accompanying drawings.

Network interface 106 may take the form of a wire line connection, such as an Ethernet, Token Ring, or T-carrier connection. Network interface 106 may alternatively take the form of a wireless connection, such as Wifi, BLUETOOTH®, or a wide-area wireless connection. However, other forms of physical layer connections and other types of standard or proprietary communication protocols may be used over network interface 106. Furthermore, network interface 106 may comprise multiple physical communication interfaces.

Input/output function 108 may facilitate user interaction with example computing device 100. Input/output function 108 may comprise multiple types of input devices, such as a keyboard, a mouse, a touch screen, a microphone and/or any other device that is capable of receiving input from a user. Similarly, input/output function 108 may comprise multiple types of output devices, such as a display, printer, one or more light emitting diodes (LEDs), speaker, or any other device that is capable of providing output discernible to a user. Additionally or alternatively, example computing device 100 may support remote access from another device, via network interface 106 or via another interface (not shown), such an RS-132 or Universal Serial Bus (USB) port.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

C. Example Architecture

Figure 2A:
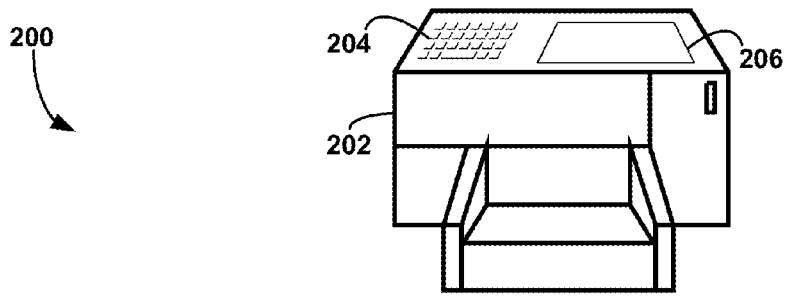
FIG. 2A is a block diagram illustrating a first printer configuration, according to an example embodiment.
Figure 2B:
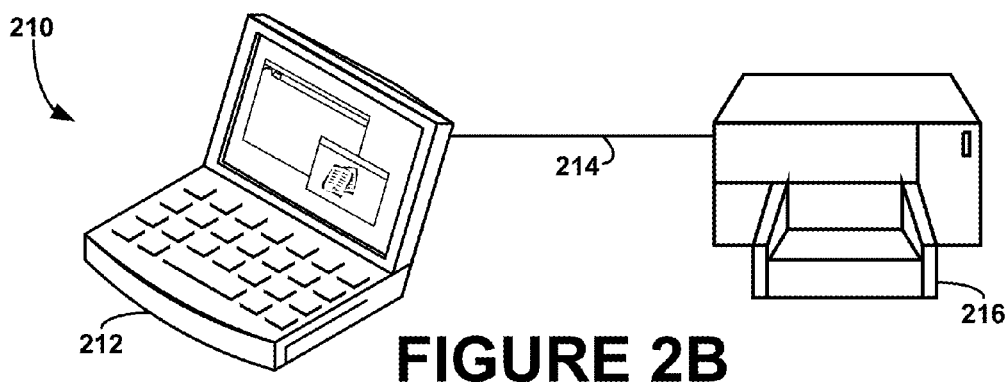
FIG. 2B is a block diagram illustrating a second printer configuration, according to an example embodiment.
Figure 2C:
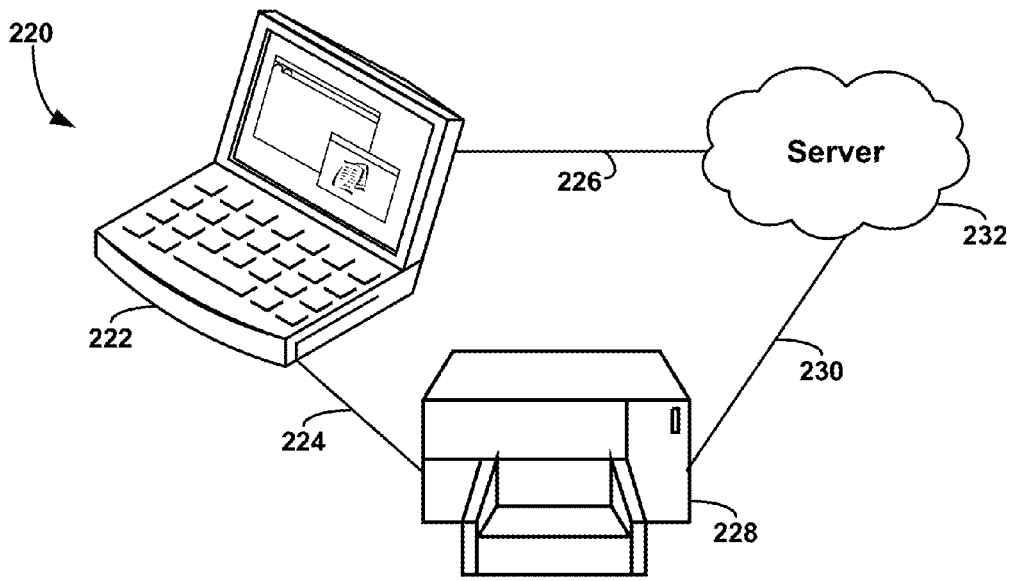
FIG. 2C is a block diagram illustrating a third printer configuration, according to an example embodiment.

FIGS. 2A, 2B, and 2C are simplified block diagrams of systems 200, 210, and 220, respectively. FIG. 2A is a block diagram illustrating a first printer configuration, according to an example embodiment. FIG. 2B is a block diagram illustrating a second printer configuration, according to another example embodiment. FIG. 2C is a block diagram illustrating a third printer configuration, according to yet another embodiment.

In FIG. 2A, system 200 includes printer 202, which may operate in accordance with the embodiments herein. Printer 202 may be a peripheral device configured to produce text and/or graphics on documents originally stored as image data. Further, printer 202 may include toner cartridges, liquid ink jets, paper feeds, belts, rollers, hard drives, power supplies, and scanners, amongst many other possibilities. Although, no other devices are shown with printer 202 in system 200, it should be understood that other devices may also be included in system 200 to function with printer 202. Printer 202 may display images on a graphical display 206 (which may also have a touch screen) and receive instructions associated with printing through keypad and keyboard 204. In some instances, graphical display 206 may also operate as a scanner to scan document and/or images. Further, printer 202 may include one or more of the functional elements illustrated in FIG. 1. For example, printer 202 may have network interface 106 as shown in FIG. 1 to utilize a wire line connection or a wireless connection (although not shown in FIG. 2A) and receive instructions for printing images from other systems or subsystems. Other possibilities may also exist.

In, FIG. 2B, system 210 includes computer 212 and printer 216, which may operate in accordance with the embodiments herein. It should be understood that other devices may also be included in system 210 to fully function with computer 212 and printer 216. Further, printer 216 may be the same or a similar printer as printer 202 in FIG. 2A and may also be capable of carrying out printing functions on its own. In system 210, communication link 214 is provided between computer 212 and printer 216. Further, communication link 214 may be used such that computer 212 and printer 216 may communicate to complete a printing task. For example, laptop computer 212 may receive an instruction to print an image and perform steps for printing preparation (e.g., accommodating different light-to-dark dynamic ranges between its monitor and printer 216). Further, computer 212 may communicate with printer 216 to print the image on paper, perhaps to print the image using the colors specified by the laptop computer.

In FIG. 2C, system 220 includes computer 222, printer 228, and server 232 which may operate in accordance with the embodiments herein. It should be understood that other devices may also be included in system 220 to function with the other devices shown. Further, printer 228 may be the same or a similar printer as printer 202 in FIG. 2A and/or printer 216 in FIG. 2B, and may also be capable of carrying out printing functions on its own. In system 220, communication links 224, 226, and 230 may be provided such that computer 222, printer 228, and server 232 may communicate to carry out printing functions. Communication links 224, 226, and 230 may be cables, wireless connections, and/or protocols for communicating through various networks such as local area networks (LAN), wide area networks (WAN), etc.

In some embodiments, a server (possibly such as server 232) may run programs remotely on behalf of client devices (e.g., computer 222 and/or printer 228). Such embodiments of remote processing may be advantageous in instances where the server maintains features more suitable for production environments. For instance, a server may include a faster CPU, increased high-performance RAM, and increased storage capacity (e.g., larger hard drives) to perform processing more efficiently than other client devices. For example, laptop computer 222 may receive an instruction to print an image on its monitor. However, laptop computer may communicate with server 232 to perform steps for printing preparation (e.g., accommodating different light-to-dark dynamic ranges between its monitor and printer 216) remotely on server 232. Upon completion of such preparation, server 232 may communicate with printer 228 to print the image on paper, perhaps to print the image using the colors specified by the laptop computer.

In some embodiments, some devices, possibly the devices illustrated in FIGS. 2A-2C, may include device drivers with information involving remote processing, device availabilities, and device-to-device-communication. In some instances, such information may involve communicating to accommodate light-to-dark dynamic ranges as described below. In some embodiments, light-to-dark dynamic ranges may include a set of colors, color ranges, color gamuts, a color medium, colors provided by a device in a particular environment, color that is measured in a standard quantitative manner, and/or color viewed in a three-dimensional volume, among other possibilities.

It should be understood that the above examples of architectures are provided for illustrative purposes. In addition to and/or alternatively to such examples, other possibilities may also exist without departing from the scope of the embodiments herein.

D. Example Methods for Accommodating Dynamic Ranges

As noted, a light-to-dark dynamic range of an image may differ from a light-to-dark dynamic range of a printer. In some instances, the light-to-dark dynamic range of the image may be bigger and/or wider than the printer's light-to-dark dynamic range, however, the opposite may also be possible. Regardless, differences between the image's light-to-dark dynamic range and the printer's light-to-dark dynamic range may result in low quality printout.

Figure 3:
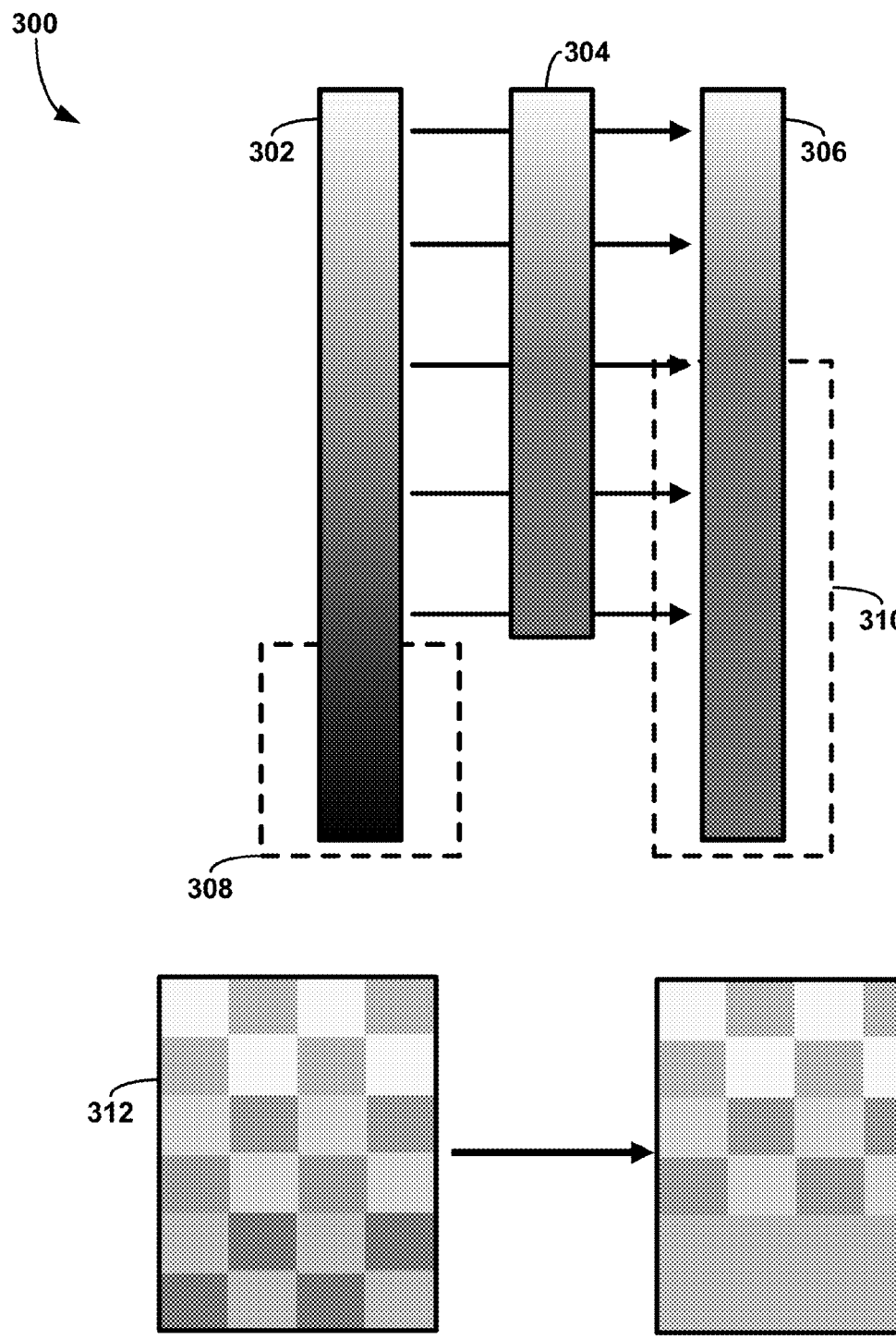
FIG. 3 is a block diagram illustrating a color mapping, according to an example embodiment.

For example, FIG. 3 is a block diagram illustrating color mapping 300, according to an example embodiment. In FIG. 3, source light-to-dark dynamic range 302 and destination light-to-dark dynamic range 304 are used to provide output light-to-dark dynamic range 306. In some instances, source light-to-dark dynamic range 302 may be representative of an image's light-to-dark dynamic range and destination light-to-dark dynamic range 304 may be representative of a printer's light-to-dark dynamic range. As illustrated, source light-to-dark dynamic range 302 is larger than destination light-to-dark dynamic range 304. Further, the color mapping between source light-to-dark dynamic range 302 and destination light-to-dark dynamic range 304 results in a loss of detail of portion 308 of light-to-dark dynamic range 302. Therefore, in output light-to-dark dynamic range 306, there is a loss of detail in portion 310 corresponding to portion 308 of source light-to-dark dynamic range 302.

As a further illustration, source color sample 312 may correspond to source light-to-dark dynamic range 302 and output color sample 314 may correspond to output light-to-dark dynamic range 306. As illustrated, the details in the dark areas of source color sample 312 are lost in output color sample 314. In particular, the dark areas in source color sample 312 correspond to areas that are "grayed-out" in output color sample 314, illustrating the loss of detail. Accordingly, example embodiments herein may involve accommodating light-to-dark dynamic ranges to eliminate such losses in details as illustrated in FIG. 3.

Figure 4:
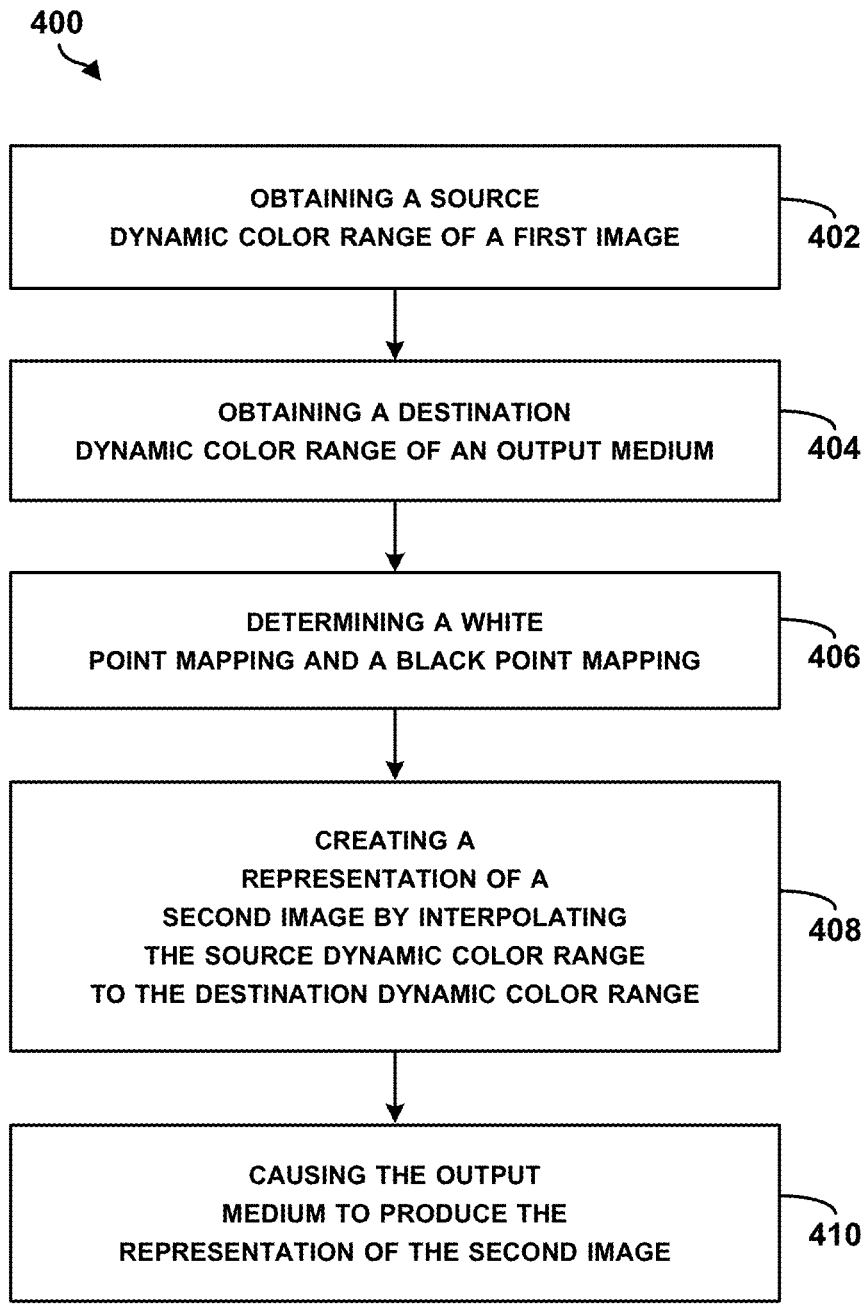
FIG. 4 is a flow chart, according to an example embodiment.

FIG. 4 is a flow chart according to an example embodiment. In FIG. 4, method 400 may be carried out by any one or more of the devices shown in FIGS. 2A-2C, or possibly by an equivalent device or a similar device thereof. Further, method 400 may be carried out in accordance with hardware (e.g., programmable systems, FPGAs, ASICs, etc.), firmware, software, and/or any combination thereof. For example, method 400 may also be associated with any of the components shown in FIG. 1 and the firmware or software that may correspond with such components. However, it should be understood that other examples may alternatively or additionally exist such that methods may be carried out at least in part by another type of device such as a mobile phone, for example, which is programmed to communicate with the printer and cause it to reproduce an image. Other examples are also possible.

As shown by block 402 of FIG. 4, method 400 involves obtaining a source light-to-dark dynamic range of a first output medium, where the source light-to-dark dynamic range comprises a source white point and a source black point. In some instances, a white point is the lightest color in its respective light-to-dark dynamic range and a black point is the darkest color in its respective light-to-dark dynamic range. Further, in some instances the white point and the black point are upper bounds and lower bounds to a light-to-dark dynamic range, respectively. In block 404, method 400 involves obtaining a destination light-to-dark dynamic range of a second output medium, where the destination light-to-dark dynamic range comprises a destination white point and a destination black point. In block 406, method 400 involves determining a white point mapping using the source white point and the destination white point, and a black point mapping using the source black point and the destination black point. Further, the destination white point and the destination black point may be at the extreme ends of the destination light-to-dark dynamic range. Yet further, a first representation of an image may be displayed on the first output medium. In block 408, based on the first representation of the image, method 400 involves creating a second representation of the image by interpolating the source light-to-dark dynamic range to the destination light-to-dark dynamic range based on the white point mapping and the black point mapping. In block 410, method 400 involves causing a second output medium to produce the second representation of the image using the destination light-to-dark dynamic range.

i. Obtaining a Light-to-Dark Dynamic Range

As noted for block 402 in FIG. 4, method 400 involves obtaining a source light-to-dark dynamic range of a first output medium and as shown in block 404, obtaining a destination light-to-dark dynamic range of a second output medium. In some embodiments, an output medium may be a computer, a black and white or color monitor, a graphical display, a television, a camera, a video recorder, a printer, a copier, a fax machine, a combination thereof, and/or any one or more of the devices shown in FIGS. 2A-2C, among other possibilities. Further, an output medium may be capable of displaying and/or printing an image. The image may be a photograph, portrait, painting, pictograph, drawing, clip art, etc. Further, the image may be in JPEG, TIFF, GIFF, PNG, BMP, and/or other file format.

In some embodiments, an output medium may be at least part of a device used to reproduce an image. As noted, for example, an output medium may be a device used to reproduce an image such as a printer, a copier, and a fax machine, amongst other possibilities. In some embodiments, an image may be displayed on a graphical display of the output medium and may also be printed by the output medium. For example, as noted in FIG. 2A, printer 202 may display images on graphical display 206 and may further print the images.

In some embodiments, a light-to-dark dynamic range may be obtained from image data. Further, a light-to-dark dynamic range (e.g., the source light-to-dark dynamic range and/or the destination light-to-dark dynamic range) may be determined by a device associated with image data such as a device storing the image data (e.g., a first output medium and/or second output medium, respectively). In some instances, a light-to-dark dynamic range may be associated with a predetermined light-to-dark dynamic range of a device. In some instances, a device's light-to-dark dynamic range is based on a standardized light-to-dark dynamic range, which may, at least in part, define a particular light-to-dark dynamic range. For example, many RGB-based devices have an sRGB light-to-dark dynamic range, which is a typical light-to-dark dynamic range used for many computer monitors, televisions, cameras, video recorders, amongst other devices. In addition, other standardized light-to-dark dynamic ranges may be used, which in some embodiments, may provide for improved color reproduction in printing. For example, the National Television System Committee (NTSC) standard provides for another possible light-to-dark dynamic range representative of a wide range of colors.

In some embodiments, a light-to-dark dynamic range may correspond to image data, irrespective of a device which may be associated with the image data. For example, a computer may include a color monitor with a 100% NTSC light-to-dark dynamic range but the image stored on the computer may only use 50% of the NTSC light-to-dark dynamic range. In such instances, the light-to-dark dynamic range may be limited by the image data, or 50% of the NTSC light-to-dark dynamic range. However, in some instances, the opposite may also be true such that the light-to-dark dynamic range of image above may be limited by a computer with a black and white monitor. In some embodiments, a light-to-dark dynamic range may be determined by an image and a particular device associated with the image. Referring back to the example above, the image may only use 50% of the NTSC light-to-dark dynamic range but a printer may only be able to print a subset of the 50% of the NTSC light-to-dark dynamic range, limiting the destination light-to-dark dynamic range shown printed on paper.

Figure 5:
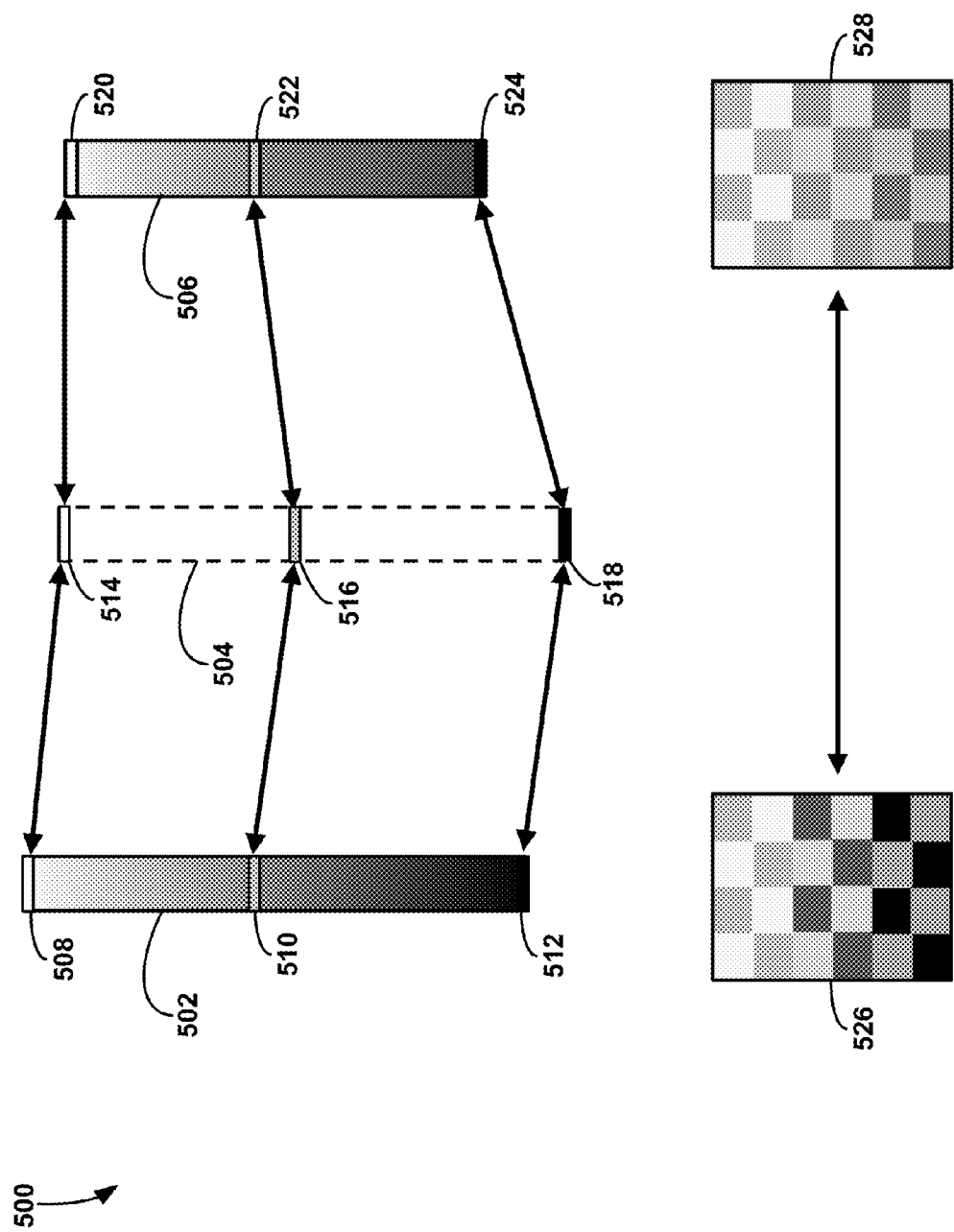
FIG. 5 is a block diagram illustrating a first mapping of colors, according to an example embodiment.

In addition, in some embodiments, a light-to-dark dynamic range may include a white point. In some embodiments, the white point (e.g., source white point and/or destination white point) is the lightest color of its respective light-to-dark dynamic range (e.g., the source light-to-dark dynamic range and/or destination light-to-dark dynamic range, respectively). However, it should be understood that the white point may be other colors in the respective light-to-dark dynamic range as well, such as the second lightest color, or the third lightest color, etc. Further, in some embodiments, there may be more than one white point in a light-to-dark dynamic range, amongst other possibilities. For example, FIG. 5 is a block diagram illustrating a first mapping of colors 500, according to an example embodiment. In FIG. 5, source light-to-dark dynamic range 502 may be associated with a source image and/or device and may include source white point 508. In addition, destination light-to-dark dynamic range 506 may be associated with an output medium and may include destination white point 520.

In addition, in some embodiments, a light-to-dark dynamic range in color mapping 500 may include a black point. In some embodiments, the black point (e.g., source black point and/or destination black point) is the darkest color of its respective light-to-dark dynamic range (e.g., the source light-to-dark dynamic range and/or destination light-to-dark dynamic range, respectively). However, it should be understood that the black point may be other colors in the respective light-to-dark dynamic range as well, such as the second darkest color, or the third darkest color, etc. Further, in some embodiments, there may be more than one black point in a light-to-dark dynamic range, amongst other possibilities. For example, source light-to-dark dynamic range 502 may be associated with a source image or device and may include source black point 512. In addition, destination light-to-dark dynamic range 506 may be associated with an output medium and may include destination black point 524.

In some embodiments, a light-to-dark dynamic range may include one or more gray points. For example, source light-to-dark dynamic range 502 may include source gray point 510. Further, source gray point 510 may be a center point halfway in between source white point 508 and source black point 512, but in some instances, may also be in other parts of light-to-dark dynamic range 502 as well. In some instances, there may be other gray points that may accompany source gray point 510. In addition, destination light-to-dark dynamic range 506 may include destination gray point 522. Further, destination gray point 522 may also be a center point halfway in between destination white point 520 and destination black point 524, but in some instances, it may also be in other parts of light-to-dark dynamic range 506 as well. Yet further, it should be understood a gray point is not necessarily restricted to a gray color and/or a shade of gray but may be any other neutral color as well. In some instances, there may be a large number of gray points.

ii. Determining a Light-to-Dark Dynamic Range in a Color Model

In some embodiments, a light-to-dark dynamic range may be determined in a color model. A color model generally allows colors to be represented using numbers, typically as tuples of numbers such as (0, 0, 0), for example. When a color model provides for a description of how colors are to be viewed using such numbers, the resulting set of colors may be referred to a color space. (However, in some instances, a "color model" and a "color space" may be used interchangeably depending on the context.) In some examples, the RGB color model provides, "R" which stands for the color red, "G" which stands for the color green, and "B" which stands for the color blue. In some instances, zero intensity for each component, (0, 0, 0) may represent the darkest color (i.e. black) and full intensity for each component, (1, 1, 1) may represent the lightest color. Further, in some instances, (1, 0, 0) may represent the color red, (0, 1, 0) may represent the color green, and (0, 0, 1) may represent the color blue.

In some embodiments, a first output medium may be a computer monitor that displays colors in red, green, and blue as determined in the RGB color model. In some instances, the RGB numbers may be converted into numerical values in the XYZ tristimulus model. The XYZ tristimulus model is another color model, but was created by the International Commission on Illumination (CIE) in 1931 as one of the first fundamental and mathematically defined color models. Further, the XYZ tristimulus model is the standard quantitative measure of human color vision. In particular, the XYZ color model may be indicative of responses of cones in the human eye.

Further, in some embodiments, the first output medium may represent its light-to-dark dynamic range in numerical values of the XYZ tristimulus model. For example, the first output medium may be an RGB color monitor displaying an image. The RGB color monitor may represent its light-to-dark dynamic range using XYZ tristimulus numerical values. Also, XYZ tristimulus numerical values may be used to find a second output medium. For example, XYZ tristimulus numerical values associated with the first output medium may be used to match XYZ tristimulus numerical values associated with the light-to-dark dynamic range of a second output medium, such as a CMYK printer. However, in other instances, XYZ tristimulus numerical values associated with the first output medium may be modified to properly match the XYZ tristimulus numerical values of the second output medium. It should be noted that "XYZ numerical values" may be referred to as "XYZ parameters." In some instances, these terms may be used interchangeable, as provided herein.

In the XYZ tristimulus model, the XYZ parameters may refer to "Y" being brightness, "Z" being quasi-equal to the color blue as perceived by the human eye, and X which may be a mixture also resembling the color red as perceived by the human eye. In some instances, the X parameter may be viewed similarly to the red value "R" of the RGB color model. Further, in some instances, the Z parameter may be viewed similarly to the blue value "B" from the RGB color model. In some embodiments, RGB numbers from an RGB color model may be converted into XYZ parameters in the XYZ color model. For example, in some instances, a transformation can be made to convert RGB values to the XYZ parameters in the XYZ color model. In some instances, a transformation may be used as shown below.

$$\begin{bmatrix} X \\ Y \\ Z \end{bmatrix} = \frac{1}{b_{21}} \begin{bmatrix} b_{11} & b_{12} & b_{13} \\ b_{21} & b_{22} & b_{23} \\ b_{31} & b_{32} & b_{33} \end{bmatrix} \begin{bmatrix} R \\ G \\ B \end{bmatrix}$$

$$= \frac{1}{0.17697} \begin{bmatrix} 0.49 & 0.31 & 0.20 \\ 0.17697 & 0.81240 & 0.01063 \\ 0.00 & 0.01 & 0.99 \end{bmatrix} \begin{bmatrix} R \\ G \\ B \end{bmatrix}$$

The example transformation shown above involves matrix multiplication, which is a binary operation that involves two matrices, and produces another matrix. For example, $X=(1/b_{21})*(b_{11})*R+(1/b_{21})*(b_{12})*G+(1/b_{21})*(b_{13})*B$. In addition, $Y=(1/b_{21})*(b_{21})*R+(1/b_{21})*(b_{22})*B+(1/b_{21})*(b_{23})*G$. Further, $Z=(1/b_{21})*(b_{31})*R+(1/b_{21})*(b_{32})*B+(1/b_{21})*(b_{33})*G$.

In some embodiments, parameters from a XYZ tristimulus model may be converted into parameters in the cone space model. For example, a cone space model may be an LMS color model. In some instances, the LMS color model may be indicative of responses of cones in the human eye. More specifically, the cone space model may be based on LMS parameters representing three types of cones in the human eye named after their sensitivity to long, medium, and short wavelengths (L, M, and S). For illustrative purposes, "L" in the LMS color model may correspond to "R" in the RGB color model since visible red light has the longest wavelength of approximately 650 nm. In addition "M" may correspond to "G" since visible green light has a medium wavelength of approximately 510 nm. Yet further, "S" may correspond to "B", since visible blue light has a short wavelength of approximately 475 nm.

Furthermore, using transformation, XYZ tristimulus parameters may be converted into LMS parameters in the cone space model. Such a transformation may also involve a chromatic adaptation transform, which may be designated as "$M_{cat}$," as described further herein. A chromatic adaptation transform may be an array of numbers, symbols, and/or expressions. Alternatively or additionally, a chromatic adaptation transform may be a matrix, plural matrices, and/or a product of matrices, among other possibilities. Further, in some embodiments, a chromatic adaptation transform may be a transformation matrix normalized to produce LMS parameters in the LMS cone space model. For example, the chromatic adaptation transform shown below may use a spectrally-sharpened Bradford chromatic adaptation matrix:

$$\begin{bmatrix} L \\ M \\ S \end{bmatrix} = \begin{bmatrix} 0.8562 & 0.3372 & -0.1934 \\ -0.8360 & 1.8327 & 0.0033 \\ 0.0357 & -0.0469 & 1.0112 \end{bmatrix} \begin{bmatrix} X \\ Y \\ Z \end{bmatrix}$$

In some embodiments, other chromatic adaptation transforms may be used to convert XYZ tristimulus parameters to the LMS color space. For example, the chromatic adaptation transform below may use $M_{cat02}$, an optimized transformation matrix from the CIECAM02 model. $M_{cat02}$ may be normalized such that the tristimulus values ($X=Y=Z=100$) produce cone responses ($L=M=S=100$):

$$\begin{bmatrix} L \\ M \\ S \end{bmatrix} = \begin{bmatrix} 0.7328 & 0.4296 & -0.1624 \\ -0.7036 & 1.6975 & 0.0061 \\ 0.0030 & 0.0136 & 0.9834 \end{bmatrix} \begin{bmatrix} X \\ Y \\ Z \end{bmatrix}$$

As such, in some embodiments, light-to-dark dynamic ranges may be obtained in cone space models. Further, using cone space models, various analyses of light-to-dark dynamic ranges are also possible. In some embodiments, the differences between light-to-dark dynamic ranges may be analyzed using a cone space model. In addition, colors from the cones space model may be reverted back to the XYZ tristimulus model. In some instances, an inverse chromatic adaptation transform, which may be designated as "$[M_{cat}^{INV}]$," may be used to revert such colors back to the XYZ color space.

In some embodiments, a conversion may be used to determine a light-to-dark dynamic range in a color model. Further, in some embodiments, a conversion may use a chromatic adaptation transform as described above. For example, the conversion below may be used:

$$XYZ_{dest} = [M_{cat}^{INV}][\text{adjust/scale}][M_{cat}]XYZ_{src}$$

In this example, "$XYZ_{src}$" may be representative of the source light-to-dark dynamic range in XYZ parameters. Further, "$M_{cat}$" may be a chromatic adaptation transform to convert XYZ parameters to the cone space model, perhaps to the LMS color model. The "[adjust/scale]" element may be representative of chromatic adaptation and perhaps interpolating light-to-dark dynamic ranges, as described further below. In addition, "$[M_{cat}^{INV}]$" may refer to an inverse chromatic adaptation transform to revert parameters from the cone space model back to XYZ parameters, thereby providing "$XYZ_{dest}$" or the destination light-to-dark dynamic range in XYZ parameters.

It should be understood that the above examples are provided for illustrative purposes. In addition to and/or alternative to the examples above, there may be many other color spaces and several other conversions and/or transformations that are also be possible, without departing from the scope of the embodiments herein.

iii. Determining Differences in Light-to-Dark Dynamic Ranges

As noted, in some embodiments, differences between light-to-dark dynamic ranges may be determined. Further, in some embodiments, differences between light-to-dark dynamic ranges may be determined in a color model such that one or more differences between light-to-dark dynamic ranges may negatively affect images on paper. In some instances, such effects may make it difficult for the human eye to perceive an image.

Figure 6:
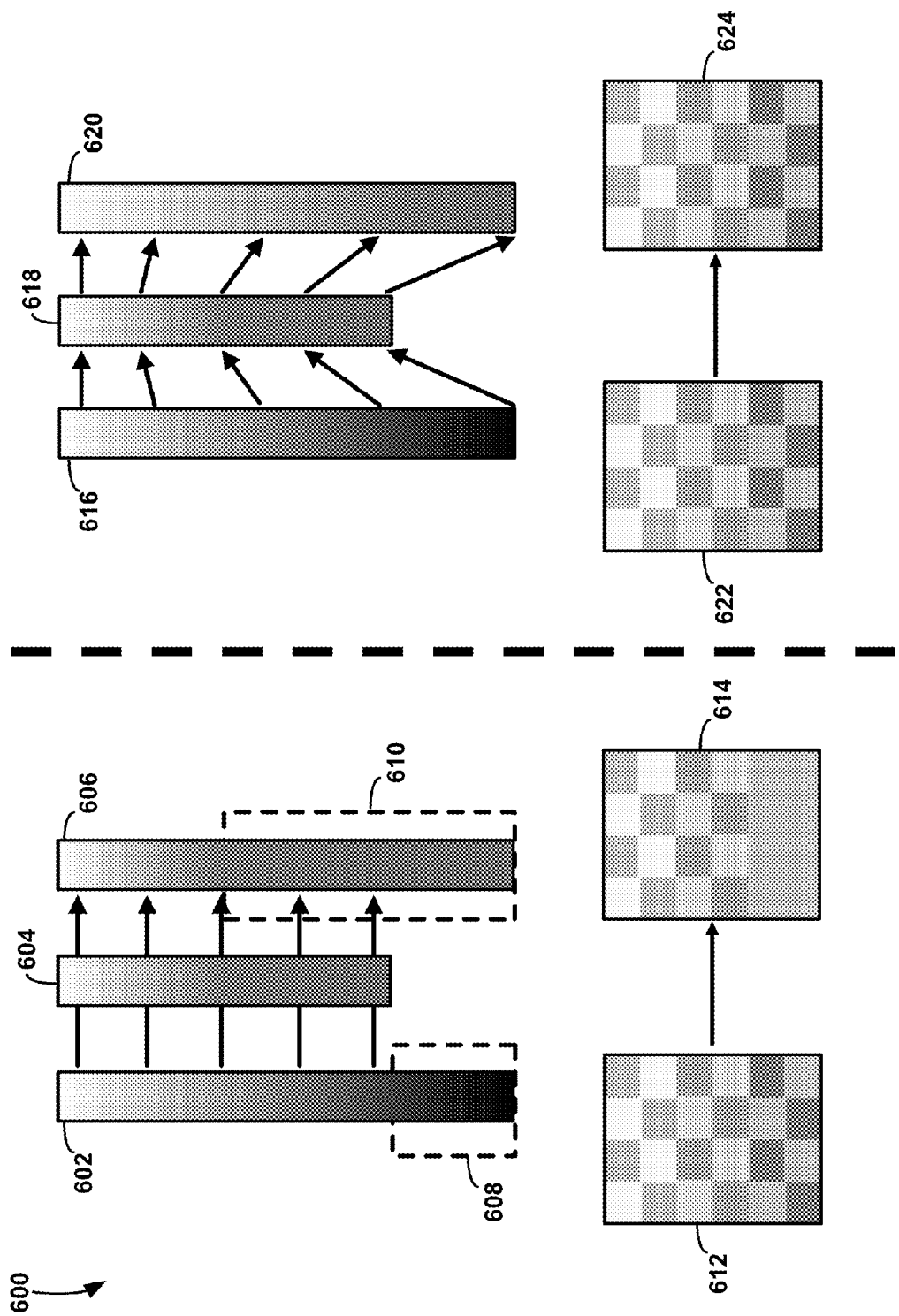
FIG. 6 is a block diagram illustrating a second mapping of colors, according to an example embodiment.

In some embodiments, the source light-to-dark dynamic range may be larger than the destination light-to-dark dynamic range. For example, FIG. 6 is a block diagram illustrating a second color mapping 600, according to an example embodiment. In FIG. 6, source light-to-dark dynamic range 602 and destination light-to-dark dynamic range 604 may be used to provide output light-to-dark dynamic range 606. In some instances, source light-to-dark dynamic range 602 may be representative of an image's light-to-dark dynamic range and destination light-to-dark dynamic range 604 may be representative of a printer's light-to-dark dynamic range. As illustrated, source light-to-dark dynamic range 602 is larger than destination light-to-dark dynamic range 604. Further, the color mapping between source light-to-dark dynamic range 602 and destination light-to-dark dynamic range 604 results in output light-to-dark dynamic range 606 not reproducing the details in portion 608 of light-to-dark dynamic range 602, perhaps amongst other portions as well. Therefore, in output light-to-dark dynamic range 606, there is a loss of detail in portion 610 corresponding to source light-to-dark dynamic range 602 being larger than destination light-to-dark dynamic range 604.

In addition, source color sample 612 may correspond to source light-to-dark dynamic range 602, and further, output color sample 614 may correspond to output light-to-dark dynamic range 606. As illustrated, the details in source color sample 612 are not reproduced in output color sample 614. In particular, the darker areas in source color sample 612 are not reproduced in output color sample 614. Rather, color sample 614 displays a loss of detail with "grayed-out" colors. A further explanation of FIG. 6 is provided in the following sections.

Figure 7:
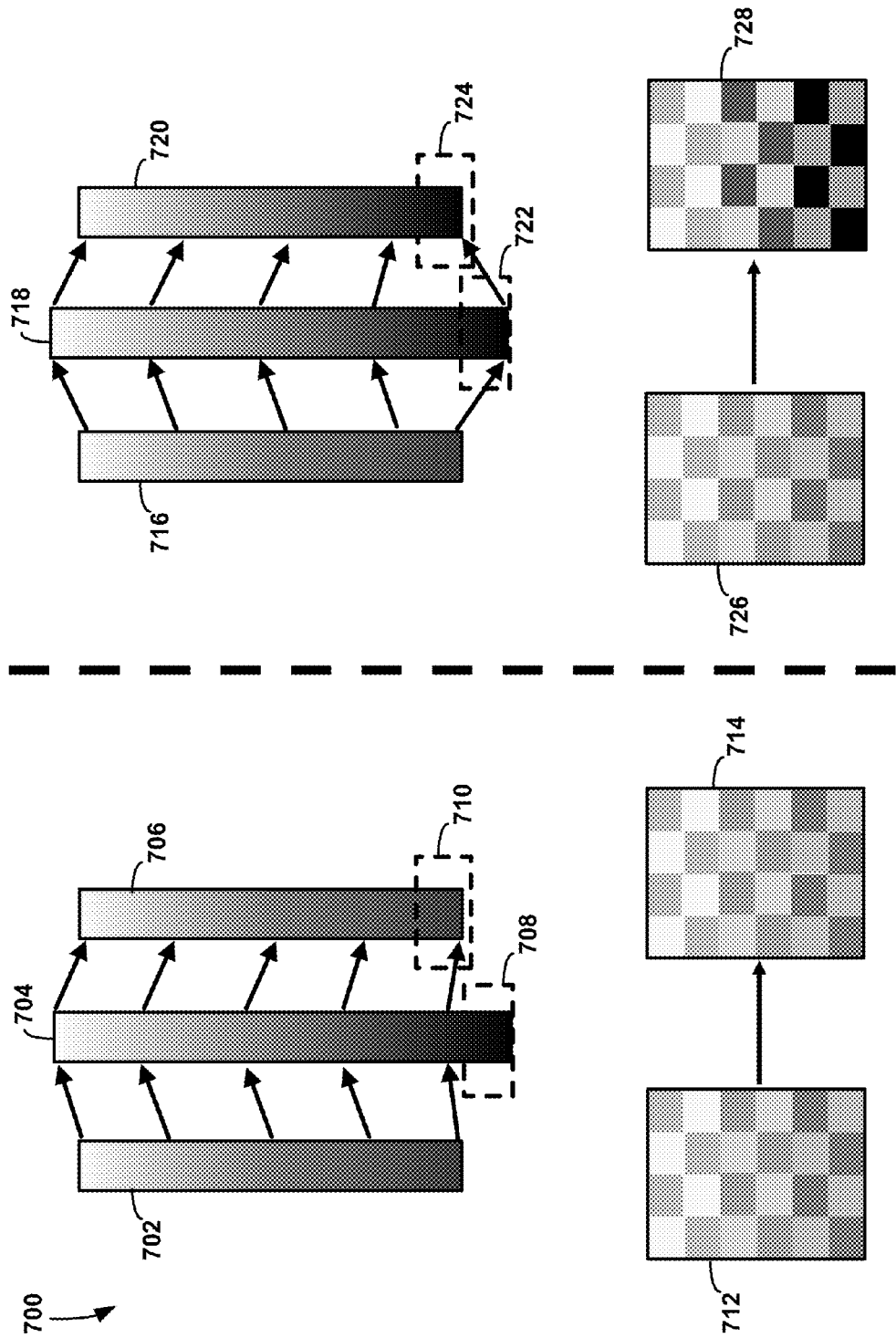
FIG. 7 is a block diagram illustrating a third mapping of colors, according to an example embodiment.

In some embodiments, the source light-to-dark dynamic range may be smaller than the destination light-to-dark dynamic range. For example, FIG. 7 is a block diagram illustrating a third color mapping 700, according to an example embodiment. In FIG. 7, source light-to-dark dynamic range 702 and destination light-to-dark dynamic range 704 may be used to provide output light-to-dark dynamic range 706. In some instances, source light-to-dark dynamic range 702 may be representative of an image's light-to-dark dynamic range and destination light-to-dark dynamic range 704 may be representative of a printer's light-to-dark dynamic range. As illustrated, source light-to-dark dynamic range 702 is smaller than destination light-to-dark dynamic range 704. Further, the color mapping between source light-to-dark dynamic range 702 and destination light-to-dark dynamic range 704 results in underutilizing destination light-to-dark dynamic range 704, as shown by portion 708. A further explanation of FIG. 7 is provided in the following sections.

In some embodiments, differences in light-to-dark dynamic ranges may create a limitation in reproducing colors. For example, underutilizing destination light-to-dark dynamic range 704 prevents darker colors from appearing in output light-to-dark dynamic range 706. In some instances, the darker colors of destination light-to-dark dynamic range 704 may appear in output light-to-dark dynamic range 706 if portion 708 was fully utilized. In addition, source color sample 712 may correspond to source light-to-dark dynamic range 702, and further, output color sample 714 may correspond to output light-to-dark dynamic range 706. As illustrated, source color sample 712 and output color sample 714 provide similar characteristics. However, it should be understood that it is possible for output color sample 714 to include darker colors (as shown in color sample 728) if destination light-to-dark dynamic range 704 was fully utilized.

In some embodiments, light-to-dark dynamic ranges may differ according to white points, black points, and/or gray points, amongst other points in the light-to-dark dynamic range. For instance, a human observer may see colors based on a representation of an image displayed on a first output medium. Further, the observer may see colors based on a white point associated with the first output medium. In particular, colors may be perceived based on the white point in the light-to-dark dynamic range of the first output medium. The colors may be observed differently based on differences in white points. For example, there may be differences between the light-to-dark dynamic ranges of the first output medium versus the light-to-dark dynamic ranges of the second output medium.

FIG. 5 illustrates how light-to-dark dynamic ranges may differ according to white points. For instance, source white point 508 of source light-to-dark dynamic range 502 may differ from destination white point 520 of destination light-to-dark dynamic range 506. Further, in some instances, source white point 508 may be lighter than destination white point 520, however, in some instances, the alternative may also occur. In some embodiments, light-to-dark dynamic ranges may differ according to black points. For example, source black point 512 may differ from destination black point 524. For instance, source black point 512 may be darker than destination black point 524, however, in some instances, the alternative may also occur. Further, in some embodiments, light-to-dark dynamic ranges may differ according to gray points. For example, source gray point 510 may be a different shade than destination gray point 522. In addition, source color sample 526 may correspond to source light-to-dark dynamic range 502 and further, destination color sample 528 may correspond to destination light-to-dark dynamic range 506. As illustrated, differences in source light-to-dark dynamic range 502 and destination light-to-dark dynamic range 506 may result in lighter and/or darker details in source color sample 526 that may not be reproduced in output color sample 528.

As noted, in some embodiments, a light-to-dark dynamic range may be represented as numerical values in the XYZ tristimulus model. In some instances, XYZ tristimulus numerical values for a source light-to-dark dynamic range may match with XYZ tristimulus numerical values for a destination light-to-dark dynamic range. However, in other instances, XYZ tristimulus numerical values for a source light-to-dark dynamic range may not provide a proper match with XYZ tristimulus numerical values for the destination light-to-dark dynamic range. For example, an image produced by using the destination light-to-dark dynamic range may exhibit less contrast between certain colors or may otherwise appear different compared to the same image produced by using the source light-to-dark dynamic range.

In these cases, XYZ tristimulus numerical values for a source light-to-dark dynamic range may be modified (e.g., using chromatic adaptation) according to differences between the source white point and the destination white point. After such a modification, an improved match with the destination light-to-dark dynamic range may be achieved. For example, in some instances, the source white point (e.g., the whitest point displayable by a computer monitor) may be adjusted to the destination white point (e.g., paper white) of a CMYK printer.

In some embodiments, light-to-dark dynamic ranges may differ according to various other aspects of images. For example, light-to-dark dynamic ranges may differ in accordance with color depth (bits per pixel), resolution (e.g., pixel resolution, spatial resolution, spectral resolution, etc.), color gradients, brightness, transparency, and color angles, among other possibilities.

It should be understood that the examples above are provided for illustrative purposes. In addition and/or alternatively to the examples above, there may be other combinations and/or sub combinations of ways that light-to-dark dynamic ranges may differ, without departing from the scope of the embodiments herein.

iv. Determining a Mapping

In some embodiments, differences between a source light-to-dark dynamic range and a destination light-to-dark dynamic range may be accommodated by a color mapping. As noted for block 406 in FIG. 4, Method 400 involves determining a white point mapping using the source white point and the destination white point, and a black point mapping using the source black point and the destination black point.

In some embodiments, a color mapping may include mapping a source white point to a destination white point. Further, a color mapping may include a mapping of a source black point to a destination black point. Yet further, a color mapping may include mapping a source gray point to a destination gray point. For example, in FIG. 5, source white point 508 may be mapped to destination white point 520. Further, source black point 512 may be mapped to destination black point 524. Yet further, source gray point 510 may be mapped to destination gray point 522.

Further, various other points between the white point and the black point may be used for color mapping. For example, multiple points between source white point 508 and source gray point 510 may be used to map colors to destination light-to-dark dynamic range 506. In addition, multiple points between source gray point 510 and source black point 512 may be used to map colors to destination light-to-dark dynamic range 506. Further, multiple points between destination white point 520 and destination gray point 522 may be used to map colors to source light-to-dark dynamic range 502. Yet further, multiple points between destination gray point 522 and destination black point 524 may be used to map colors to source light-to-dark dynamic range 502. In some instances, every color in source light-to-dark dynamic range 502 may be mapped to a respective color in destination light-to-dark dynamic range 506. Other possibilities may also exist.

In addition, a color mapping may include accommodations for human visualization. As noted, in some instances, colors may be converted to a cone space model. Further, cone signals from the cone space model may be chromatically adapted such that the source light-to-dark dynamic range may be adjusted and/or scaled using the source white point and the destination white point. Yet further, in some instances, chromatically adapted cone signals from a cone space model may be used for color mapping. For example, in FIG. 5, source white point 508 may be chromatically adapted to determine white point 514. In addition, source black point 512 may be chromatically adapted to determine black point 518. Further, source gray point 510 may be chromatically adapted to determine gray point 516. In some instances, other colors in source light-to-dark dynamic range 502 may also be chromatically adapted. Further, in some embodiments, destination light-to-dark dynamic range 504 may also be chromatically adapted.

Further, in some embodiments, the cone signals represented as values in the LMS color space may be chromatically adapted to a destination light-to-dark dynamic range. As indicated, cone signals may correspond with responses of cones in the human eye for accommodating human visualization. For illustration, source white point 508 may be chromatically adapted to destination white point 520 to determine white point 514. In addition, source black point 512 may be chromatically adapted to destination black point 524 to determine black point 518. Yet further, source gray point 510 may be chromatically adapted to destination gray point 522 to determine gray point 516. In addition, other cone signals may be chromatically adapted to points in destination light-to-dark dynamic range 506. Yet further, in some embodiments, the destination light-to-dark dynamic range may undergo chromatic adaptation to map colors as well.

It should be understood that the examples above are provided for illustrative purposes. In addition and/or alternative to the examples above, many other combinations and/or sub combinations of color mappings may also be possible, without departing from the scope of the embodiments herein.

v. Interpolating Light-to-Dark Dynamic Ranges

In some embodiments, color mappings may be used to interpolate light-to-dark dynamic ranges. Further, such interpolations may utilize a first representation of an image that may be displayed on the first output medium. In block 408 of FIG. 4, based on the first representation of the image, method 400 involves creating a second representation of the image by interpolating the source light-to-dark dynamic range to the destination light-to-dark dynamic range based on the white point mapping and the black point mapping.

In some embodiments, interpolating light-to-dark dynamic ranges involves adjusting pixels of an image on an output medium. Further, in some embodiments, an image on an output medium may be adjusted based on its light-to-dark dynamic range, possibly the source light-to-dark dynamic range. Yet further, an adjustment may be based on specific points in the source light-to-dark dynamic range and the destination light-to-dark dynamic range. In particular, the image may be adjusted based on a white point, a black point, and/or a gray point in the source light-to-dark dynamic range and/or the destination light-to-dark dynamic range. In some instances, the image may be adjusted based on mappings between the source light-to-dark dynamic range and the destination light-to-dark dynamic range, possibly as described in the preceding section. For instance, the color mapping between chromatically adapted white point 514 and destination white point 520 may be used to adjust the image, perhaps adjusting a white point from the image to chromatically adapted white point 514.

In some embodiments, interpolating light-to-dark dynamic ranges involves a conversion. As noted, for example, the conversion below may be used for interpolating light-to-dark dynamic ranges:

$$XYZ_{dest} = [M_{cat}^{inv}][adjust/scale][M_{cat}]XYZ_{src}$$

As indicated, "$XYZ_{src}$" may be representative of the source light-to-dark dynamic range in XYZ numbers in the XYZ color model. Further, "$M_{cat}$" may be a chromatic adaptation transform to convert XYZ numbers to the cone space model, perhaps to the LMS cone space model. The "[adjust/scale]" variable may be representative of interpolating light-to-dark dynamic ranges using chromatic adaptation, possibly for chromatically adapting cone signals to a destination light-to-dark dynamic range. Further, various color points (e.g., black points, white points, gray points, etc.) and/or color mappings between the source light-to-dark dynamic range and the destination light-to-dark dynamic range may be used to interpolate light-to-dark dynamic ranges, among other possibilities. For example, as in FIG. 5, the color points in source light-to-dark dynamic range 502 may be represented in the LMS color space using ($L_{src}$, $M_{src}$, $S_{src}$) values. $L_{src}$ may be a "long-wavelength-source cone space response", $M_{src}$ may be a "medium-wavelength-source cone space response", and $S_{src}$ may be a "short-wavelength-source cone space response". Yet further, a source white point, such as source white point 508, may be determined by $L_{W,src}$, $M_{W,src}$, and $S_{W,src}$ values. $L_{W,src}$ may be a "long-wavelength-source-white-point cone space response", $M_{W,src}$ may be a "medium-wavelength-source-white-point cone space response", and $S_{W,src}$ may be a "short-wavelength-source-white-point cone space response".

In some embodiments, a destination light-to-dark dynamic range may be determined in the LMS cone space model. For example, destination white point 520 may be represented by LMS values such as $L_{W,dest}$ ("long-wavelength-destination-white-point cone space response"), $M_{W,dest}$ ("medium-wavelength-destination-white-point cone space response"), and $S_{W,dest}$ ("short-wavelength-destination-white-point cone space response"). In addition, destination black point 524 may be represented by LMS values including $L_{B,dest}$ ("long-wavelength-destination-black-point cone space response"), $M_{B,dest}$ ("medium-wavelength-destination-black-point cone space response"), and $S_{B,dest}$ ("short-wavelength-destination-black-point cone space response").

As noted, in some embodiments, the source light-to-dark dynamic range may be adjusted based on chromatically adapted cone signals. For example, $L'_{src}$ ("long-wavelength-source-adapted cone space response") may be a chromatically adapted source cone signal and may be calculated using the following equation: $L'_{src}=L_{src}(L_{W,dest}/L_{W,src})$. Further, $M'_{src}$ ("medium-wavelength-source-adapted cone space response") may be a chromatically adapted source cone signal and may be calculated using the following equation: $M'_{src}=M_{src}(M_{W,dest}/M_{W,src})$. Yet further, $S'_{src}$ ("short-wavelength-source-adapted cone space response") may be a chromatically adapted source cone signal and may be calculated using the following equation: $S'_{src}=S_{src}(S_{W,dest}/S_{W,src})$.

Further, in some embodiments, chromatically adapted cone signals may be referred to as intermediate points. For example, chromatically adapted light-to-dark dynamic range 504 may provide intermediate points for interpolating colors. In some instances, chromatically adapted light-to-dark dynamic range 504 may include points referred to as "source intermediate points" and further, in some instances, chromatically adapted light-to-dark dynamic range 504 may include points referred to as "destination intermediate points," amongst several other possibilities.

In addition, in some embodiments, chromatically adapted cone signals may be represented by LMS values for interpolating colors. For example, chromatically adapted white point 514 may be represented by LMS values including $L'_{W,src}$ ("long-wavelength-source-white-point-adapted cone space response"), $M'_{W,src}$ ("medium-wavelength-source-white-point-adapted cone space response"), and $S'_{W,src}$ ("short-wavelength-source-white-point-adapted cone space response"). In addition, chromatically adapted black point 518 may be represented by LMS values including $L'_{B,src}$ ("long-wavelength-source-black-point-adapted cone space response"), $M'_{B,src}$ ("medium-wavelength-source-black-point-adapted cone space response"), $S'_{B,src}$ ("short-wavelength-source-black-point-adapted cone space response"). Yet further, chromatically adapted intermediate point 516 may be represented by LMS values as well.

Further, in some embodiments, LMS values for points in the destination light-to-dark dynamic range may be determined for interpolating colors. In some instances, interpolating colors involve using chromatically adapted cone signals. For example, $L_{dest}$ values (long-wavelength-destination cone space response) for destination color space 506 may be obtained using the following conversions:

$$L_{dest}=[(L'_{src}-L'_{B,src})/(L'_{W,src}-L'_{B,src})](L_{W,dest}-L_{B,dest})+L_{B,dest}.$$

Further, $M_{dest}$ values (medium-wavelength-destination cone space response) for destination color space 506 may be obtained using the following conversions:

$$M_{dest}=[(M'_{src}-M'_{B,src})/(M'_{W,src}-M'_{B,src})](M_{W,dest}-M_{B,dest})+M_{B,dest}.$$

Yet further, $S_{dest}$ values (short-wavelength-destination cone space response) for destination color space 506 may be obtained using the following conversions:

$$S_{dest}=[(S'_{src}-S'_{B,src})/(S'_{W,src}-S'_{B,src})](S_{W,dest}-S_{B,dest})+S_{B,dest}.$$

In some embodiments, a nonlinear interpolation may be used between light-to-dark dynamic ranges. In some instances, there may be an N:1 correlation of colors from the source light-to-dark dynamic range to a color in the destination light-to-dark dynamic range. Alternatively, there may be a 1:N correlation from a color in the source light-to-dark dynamic range to colors in the destination light-to-dark dynamic range. Further, in some instances, the ratio of colors from a source light-to-dark dynamic range to colors in the destination light-to-dark dynamic range may not be constant, but rather, such a ratio may be dynamic, depending on the portion of the source light-to-dark dynamic range and/or the destination light-to-dark dynamic range. Other possibilities may also exist.

In some embodiments, the source light-to-dark dynamic range may be adjusted by interpolating light-to-dark dynamic ranges between a source light-to-dark dynamic range and the destination light-to-dark dynamic range. It should be noted that such adjustments may vary depending on several factors including differences between light-to-dark dynamic ranges, which may be differences between the light-to-dark dynamic range of an image and the light-to-dark dynamic range of a printer. However other factors may also include user preferences, lighting conditions in the image, and possibly the objects shown in the image, among several other possibilities.

Further, in some embodiments, interpolating colors from the cones space model may involve reverting colors back to the XYZ tristimulus model. For example, in some instances, an inverse chromatic adaptation transform may be used to revert such colors from the LMS cones space model back to the XYZ color space. Further, in some instances, an inverse matrix, such as $[M_{cat}^{INV}]$, may be used for an inverse chromatic adaptation transform.

It should be understood that the examples above are provided for illustration. Further, in addition and/or alternatively to the examples above, there may be other combinations and/or sub combinations for interpolating light-to-dark dynamic ranges, without departing from the scope of the embodiments herein.

vi. Producing a Representation

In some embodiments, light-to-dark dynamic ranges may be interpolated to produce a representation of an image. In block 410, method 400 of FIG. 4 involves causing a second output medium to produce the second representation of the image using the destination light-to-dark dynamic range. Further, a representation of an image may be a reproduction of colors displayed with an output medium and/or a printed version of the colors associated with an output medium, possibly printed on paper white. In some instances, an image may be a printed version of a photograph, a portrait, a drawing, a sketch, a painting, a pictograph, a graphic, an illustration, a diagram, and/or other representation. In some instances, an image may be associated with an output medium, which may be a printer, a copier, and/or a fax machine, amongst other possibilities. In some instances, an image may be associated with any of the devices shown in FIGS. 2A-2C.

In some embodiments, a representation of the image may be produced when the source light-to-dark dynamic range is larger than the destination light-to-dark dynamic range. For example, referring back to FIG. 6, source light-to-dark dynamic range 616 (which may be the same as source light-to-dark dynamic range 602) may be larger than destination light-to-dark dynamic range 618 (which may be the same as destination light-to-dark dynamic range 604). After possibly interpolating light-to-dark dynamic ranges including a chromatic adaptation of source light-to-dark dynamic range 616, output light-to-dark dynamic range 620 may be associated with a representation of the image and/or possibly used to create the representation. As shown, output light-to-dark dynamic range 620 provides more detail than output light-to-dark dynamic range 606, as further illustrated by the abundance of details in output light-to-dark dynamic range 620 as opposed to the lack of details in portion 610 of output light-to-dark dynamic range 606. In addition, source color sample 622 may correspond to source light-to-dark dynamic range 616 and output color sample 624 may correspond to output light-to-dark dynamic range 620. As illustrated, output color sample 624 does not have the loss of details as shown in the grayed-out colors in output color sample 614.

In some embodiments, a representation of the image may be produced when the source light-to-dark dynamic range is smaller than the destination light-to-dark dynamic range. For example, referring back to FIG. 7, source light-to-dark dynamic range 716 (which may be the same as source light-to-dark dynamic range 702) may be smaller than destination light-to-dark dynamic range 718 (which may be the same as destination light-to-dark dynamic range 704). After possibly interpolating light-to-dark dynamic ranges including a chromatic adaptation of source light-to-dark dynamic range 716, output light-to-dark dynamic range 720 may be associated with a representation of the image and/or possibly used to create the representation. As shown, output light-to-dark dynamic range 720 provides for more detail than output light-to-dark dynamic range 706, as further illustrated by the abundance of dark colors in portion 724 as opposed to the lack of dark colors in portion 710 of destination light-to-dark dynamic range 704. Further, the darker colors in portion 724 may be caused by the full utilization of destination light-to-dark dynamic range 718, including portion 722. As a further illustration, output color sample 728 includes darker colors that are not produced in output color sample 714 (nor are they shown in source color sample 726).

It should be understood that the examples above are provided for illustrative purposes. In addition and/or alternatively to such examples, other combinations and/or sub combinations for producing representations of images may also exist, without departing from the scope of the embodiments herein.

D. Accommodating Light-to-Dark Dynamic Ranges Using an XYZ Color Space

Figure 8:
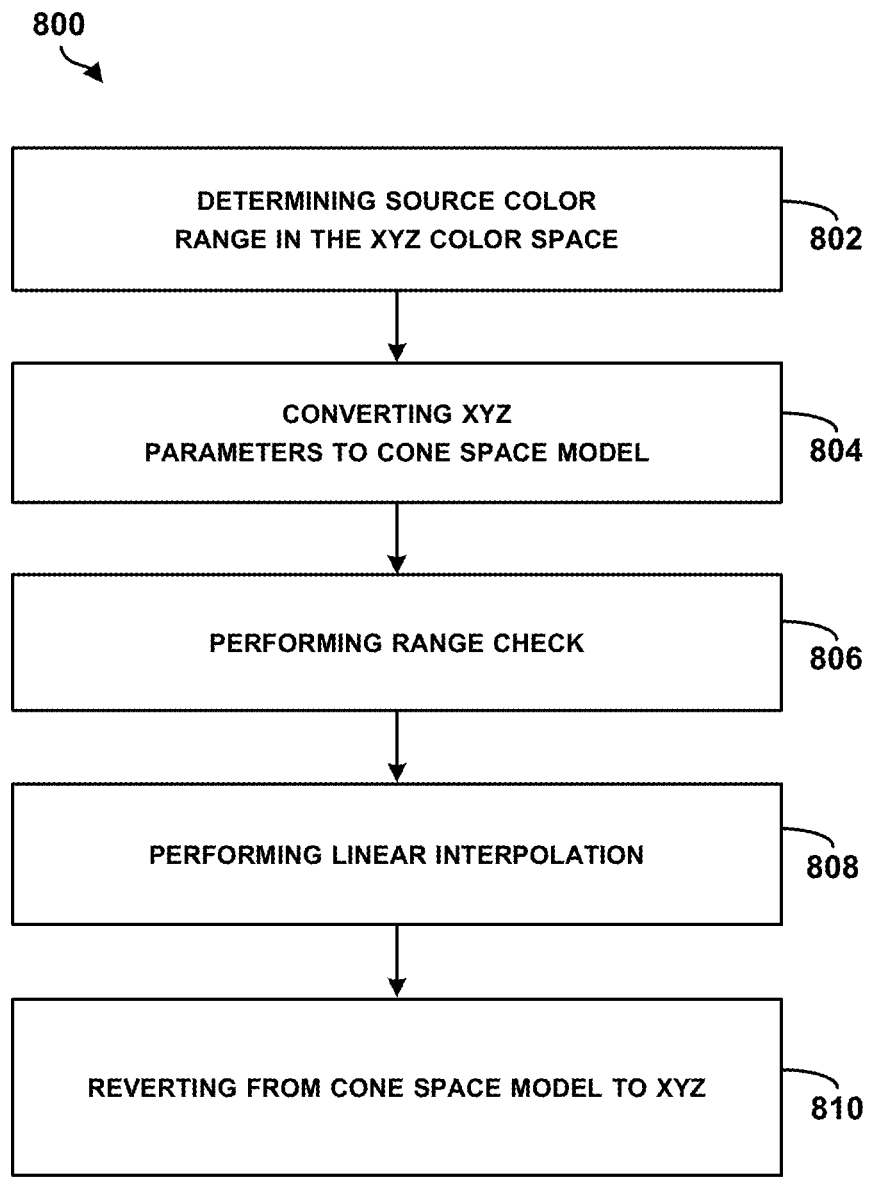
FIG. 8 is another flow chart, according to an example embodiment.

In some embodiments, light-to-dark dynamic ranges may be accommodated using the XYZ color space. FIG. 8 is another flow chart, according to an example embodiment. In FIG. 8, method 800 is described by way of being carried out by any one or more of the devices shown in FIGS. 2A-2C, or possibly may be an equivalent or similar device thereof. Further, method 800 may be carried out in accordance with hardware (e.g., programmable systems, FPGAs, ASICs, etc.), firmware, software, and/or any combination thereof. For example, method 800 may also be associated with any of the components shown in FIG. 1 and the firmware or software that may correspond with such components. However, it should be understood that other examples may alternatively or additionally exist such that methods may be carried out at least in part by a device such as a desktop, PC, or a mobile phone, for example, which is programmed to communicate with the printer and cause it to reproduce an image. Other examples are also possible.

As shown by block 802 of FIG. 8, method 800 involves determining a source light-to-dark dynamic range in the XYZ color space. In some instances, the source range may be associated with an image in an RGB color model. Further, as noted for some embodiments, RGB numbers from an RGB color model may be converted into XYZ parameters in the XYZ color model. In block 804, method 800 involves converting XYZ parameters to numbers in a cone space model, possibly the LMS cone space model. As indicated, in some instances, a chromatic adaptation transform, $[M_{cat}]$, may be used to convert XYZ values to parameters in a cone space model. In block 806, method 800 involves performing a range check, possibly between the source light-to-dark dynamic range and the destination light-to-dark dynamic range. In some embodiments, a range check may determine differences between the source light-to-dark dynamic range and the destination light-to-dark dynamic range, amongst other possibilities. Further, in some instances, determining such differences may modify the following steps of method 800.

In block 808, method 800 involves performing a linear interpolation, possibly between the source light-to-dark dynamic range and destination light-to-dark dynamic range based on the white point mapping and the black point mapping. In some embodiments, the linear interpolation may be used for creating a representation of an image. Further, the linear interpolation may include a chromatic adaptation of colors in the source light-to-dark dynamic range and a mapping of the chromatically adapted colors to the destination light-to-dark dynamic range. In some embodiments, a postscript implementation may be used to perform chromatic adaptation and compensating for color points (e.g., black points) between light-to-dark dynamic ranges. For example, the following is a postscript implementation that may be used:

/TransformPQR [
{4 index 3 get div 2 index 3 get mul 2 index 3 get 2 index 3 get sub
mul 2 index 3 get 4 index 3 get 3 index 3 get sub mul sub 3 index 3
get 3 index 3 get exch sub div exch pop exch pop exch pop exch pop }
bind -continued

```
{4 index 4 get div 2 index 4 get mul 2 index 4 get 2 index 4 get sub
mul 2 index 4 get 4 index 4 get 3 index 4 get sub mul sub 3 index 4
get 3 index 4 get exch sub div exch pop exch pop exch pop exch pop }
bind
{4 index 5 get div 2 index 5 get mul 2 index 5 get 2 index 5 get sub
mul 2 index 5 get 4 index 5 get 3 index 5 get sub mul sub 3 index 5
get 3 index 5 get exch sub div exch pop exch pop exch pop exch pop }
bind
]
```

In block 810, method 800 involves reverting from a cone space model to the XYZ color model. Further, in some instances, LMS numbers from the LMS cones space model may be reverted to XYZ parameters in the XYZ color model using an inverse transformation. In some instances, an inverse chromatic adaptation transform, such as $[M_{cat}^{INV}]$, may be used to revert to the XYZ color model.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. With respect to any or all of the ladder diagrams, scenarios, and flow charts in the figures and as discussed herein, each block and/or communication may represent a processing of information and/or a transmission of information in accordance with example embodiments and alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

I claim:

1. A method comprising:
   a computing device obtaining a source light-to-dark dynamic range of a first output medium, wherein the source light-to-dark dynamic range comprises a source white point and a source black point;
   the computing device obtaining a destination light-to-dark dynamic range of a second output medium, wherein the destination light-to-dark dynamic range comprises a destination white point and a destination black point;
   the computing device determining a white point mapping using the source white point and the destination white point, and a black point mapping using the source black point and the destination black point;
   based on a first representation of an image that has been displayed on the first output medium, the computing device creating a second representation of the image by interpolating the source light-to-dark dynamic range to the destination light-to-dark dynamic range based on the white point mapping and the black point mapping; and
   the computing device causing the second output medium to produce the second representation of the image using the destination light-to-dark dynamic range,
   wherein interpolating the source light-to-dark dynamic range to the destination light-to-dark dynamic range based on the white point mapping and the black point mapping further comprises:
   determining the source light-to-dark dynamic range and the destination light-to-dark dynamic range within a XYZ tristimulus model;
   based on the XYZ tristimulus model, determining the source light-to-dark dynamic range and the destination light-to-dark dynamic range in a cone space model, wherein the cone space model represents colors based in part on responses from photoreceptors in a human eye; and
   adjusting the source light-to-dark dynamic range based in part on: (i) the destination light-to-dark dynamic range, (ii) the source white point, and (iii) the destination white point within the cone space model,
   wherein adjusting the source light-to-dark dynamic range further comprises approximating LMS colors based in part on the source white point and the source black point in the cone space model and the destination white point and the destination black point in the cone space model, wherein approximating the LMS colors further comprises:
   determining $L_{dest}$, wherein $L_{dest}=[(L'_{src}-L'_{B,src})/(L'_{W,src}-L'_{B,src})](L_{W,dest}-L_{B,dest})+L_{B,dest}$, wherein $L'_{src}=L_{src}(L_{W,dest}/L_{W,src})$, $L_{src}$ is a long-wavelength-source cone space response, $L_{W,src}$ is a long-wavelength-source-white-point cone space response, $L_{dest}$ is a long-wavelength-destination cone space response, $L'_{src}$ is a long-wavelength-source-adapted cone space response, $L'_{B,src}$ is a long-wavelength-source-black-point-adapted cone space response, $L'_{W,src}$ is a long-wavelength-source-white-point-adapted cone space response, $L_{W,dest}$ is a long-wavelength-destination-white-point cone space response, and $L_{B,dest}$ is a long-wavelength-destination-black-point cone space response;
   determining $M_{dest}$, wherein $M_{dest}=[(M'_{src}-M'_{B,src})/(M'_{W,src}-M'_{B,src})](M_{W,dest}-M_{B,dest})+M_{B,dest}$, wherein $M'_{src}=M_{src}(M_{W,dest}/M_{W,src})$, $M_{src}$ is a medium-wavelength-source cone space response, $M_{W,src}$ is a medium-wavelength-source-white-point cone space response, $M_{dest}$ is a medium-wavelength-destination cone space response, $M'_{src}$ is a medium-wavelength-source-adapted cone space response, $M'_{B,src}$ is a medium-wavelength-source-black-point-adapted cone space response, $M'_{W,src}$ is a medium-wavelength-source-white-point-adapted cone space response, $M_{W,dest}$ is a medium-wavelength-destination-white-point cone space response, and $M_{B,dest}$ is a medium-wavelength-destination-black-point cone space response; and
   determining $S_{dest}$, wherein $S_{dest}=[(S'_{src}-S'_{B,src})/(S'_{W,src}-S'_{B,src})](S_{W,dest}-S_{B,dest})+S_{B,dest}$, wherein $S'_{src}=(S_{W,dest}/S_{W,src})$, $S_{src}$ is a short-wavelength-source cone space response, $S_{W,src}$ is a short-wavelength-source-white-point cone space response, $S_{dest}$ is a short-wavelength-destination cone space response, $S'_{src}$ is a short-wavelength-source-adapted cone space response, $S'_{B,src}$ is a short-wavelength-source-black-point-adapted cone space response, $S'_{W,src}$ is a short-wavelength-source-white-point-adapted cone space response, $S_{W,dest}$ is a short-wavelength-destination-white-point cone space response, and $S_{B,dest}$ is a short-wavelength-destination-black-point cone space response.

2. The method of claim 1, wherein the source light-to-dark dynamic range is bounded by the source white point and the source black point, and wherein the destination light-to-dark dynamic range is bounded by the destination white point and the destination black point.

3. The method of claim 1, wherein creating the second representation of the image by interpolating the source light-to-dark dynamic range to the destination light-to-dark dynamic range comprises:
  adjusting the colors of the first representation of the image to create the second representation of the image such that pixels of the first representation of the image corresponding to the source white point are adjusted to the destination white point in the second representation of the image, and pixels of the first representation of the image corresponding to the source black point are adjusted to the destination black point in the second representation of the image.

4. The method of claim 3, wherein interpolating the source light-to-dark dynamic range to the destination light-to-dark dynamic range comprises determining an intermediate point mapping between a source intermediate point of the source light-to-dark dynamic range and a destination intermediate point of the destination light-to-dark dynamic range, and wherein creating the second representation of the image by interpolating the source light-to-dark dynamic range to the destination light-to-dark dynamic range further comprises:
  adjusting the colors of the first representation of the image to create the second representation of the image such that pixels of the first representation of the image corresponding to the source intermediate point are adjusted to the destination intermediate point in the second representation of the image.

5. The method of claim 1, wherein the source light-to-dark dynamic range differs from the destination light-to-dark dynamic range.

6. The method of claim 1, wherein determining the source light-to-dark dynamic range and the destination light-to-dark dynamic range in the cone space model involves using a chromatic adaptation transform.

7. The method of claim 1, wherein adjusting the source light-to-dark dynamic range based in part on: (i) the destination light-to-dark dynamic range, (ii) the source white point and (iii) the destination white point within the cone space model further comprises a reversion from the cone space model to the XYZ tristimulus model.

8. The method of claim 7, wherein the reversion from the cone space model to the XYZ tristimulus model comprises using an inverse chromatic adaptation transform to provide the second output medium within the XYZ tristimulus model.

9. An article of manufacture including a non-transitory computer-readable medium, having stored thereon program instructions that, upon execution by a computing device, cause the computing device to perform operations comprising:
  obtaining a source light-to-dark dynamic range of a first output medium, wherein the source light-to-dark dynamic range comprises a source white point and a source black point;
  obtaining a destination light-to-dark dynamic range of a second output medium, wherein the destination light-to-dark dynamic range comprises a destination white point and a destination black point;
  determining a white point mapping using the source white point and the destination white point, and a black point mapping using the source black point and the destination black point;
  based on a first representation of an image that has been displayed on the first output medium, creating a second representation of the image by interpolating the source light-to-dark dynamic range to the destination light-to-dark dynamic range based on the white point mapping and the black point mapping; and
  causing the second output medium to produce the second representation of the image using the destination light-to-dark dynamic range,
  wherein interpolating the source light-to-dark dynamic range to the destination light-to-dark dynamic range based on the white point mapping and the black point mapping further comprises:
    determining the source light-to-dark dynamic range and the destination light-to-dark dynamic range within a XYZ tristimulus model;
    based on the XYZ tristimulus model, determining the source light-to-dark dynamic range and the destination light-to-dark dynamic range in a cone space model, wherein the cone space model represents colors based in part on responses from photoreceptors in a human eye; and
    adjusting the source light-to-dark dynamic range based in part on: (i) the destination light-to-dark dynamic range, (ii) the source white point, and (iii) the destination white point within the cone space model,
  wherein adjusting the source light-to-dark dynamic range further comprises approximating LMS colors based in part on the source white point and the source black point in the cone space model and the destination white point and the destination black point in the cone space model, wherein approximating the LMS colors further comprises:
    determining $L_{dest}$, wherein $L_{dest}=[(L'_{src}-L'_{B,src})/(L'_{W,src}-L'_{B,src})](L_{W,dest}-L_{B,dest})+L_{B,dest}$, wherein $L'_{src}=L_{src}(L_{W,dest}/L_{W,src})$, $L_{src}$ is a long-wavelength-source cone space response, $L_{W,src}$ is a long-wavelength-source-white-point cone space response, $L_{dest}$ is a long-wavelength-destination cone space response, $L'_{src}$ is a long-wavelength-source-adapted cone space response, $L'_{B,src}$ is a long-wavelength-source-black-point-adapted cone space response, $L'_{W,src}$ is a long-wavelength-source-white-point-adapted cone space response, $L_{W,dest}$ is a long-wavelength-destination-white-point cone space response, and $L_{B,dest}$ is a long-wavelength-destination-black-point cone space response;
    determining $M_{dest}$, wherein $M_{dest}=[(M'_{src}-M'_{B,src})/(M'_{W,src}-M'_{B,src})](M_{W,dest}-M_{B,dest})+M_{B,dest}$, wherein $M'_{src}=M_{src}(M_{W,dest}/M_{W,src})$, $M_{src}$ is a medium-wavelength-source cone space response, $M_{W,src}$ is a medium-wavelength-source-white-point cone space response, $M_{dest}$ is a medium-wavelength-destination cone space response, $M'_{src}$ is a medium-wavelength-source-adapted cone space response, $M'_{B,src}$ is a medium-wavelength-source-black-point-adapted cone space response, $M'_{W,src}$ is a medium-wavelength-source-white-point-adapted cone space response, $M_{W,dest}$ is a medium-wavelength-destination-white-point cone space response, and $M_{B,dest}$ is a medium-wavelength-destination-black-point cone space response; and
    determining $S_{dest}$, wherein $S_{dest}=[(S'_{src}-S'_{B,src})/(S'_{W,src}-S'_{B,src})](S_{W,dest}-S_{B,dest})+S_{B,dest}$, wherein $S'_{src}=S_{src}(S_{W,dest}/S_{W,src})$, $S_{src}$ is a short-wavelength-source cone space response, $S_{W,src}$ is a short-wavelength-source-white-point cone space response, $S_{dest}$ is a short-wavelength-destination cone space response, $S'_{src}$ is a short-wavelength-source-adapted cone space response, $S'_{B,src}$ is a short-wavelength-source-black-point-adapted cone space response, $S'_{W,src}$ is a short-wavelength-source-white-point-adapted cone space response, $S_{W,dest}$ is a short-wavelength-destination-white-point cone space response, and $S_{B,dest}$ is a short-wavelength-destination-black-point cone space response.

10. The article of manufacture of claim 9, wherein creating the second representation of the image by interpolating the source light-to-dark dynamic range to the destination light-to-dark dynamic range comprises:
adjusting the colors of the first representation of the image to create the second representation of the image such that pixels of the first representation of the image corresponding to the source white point are adjusted to the destination white point in the second representation of the image, and pixels of the first representation of the image corresponding to the source black point are adjusted to the destination black point in the second representation of the image.

11. The article of manufacture of claim 10, wherein interpolating the source light-to-dark dynamic range to the destination light-to-dark dynamic range comprises determining an intermediate point mapping between a source intermediate point of the source light-to-dark dynamic range and a destination intermediate point of the destination light-to-dark dynamic range, and wherein creating the second representation of the image by interpolating the source light-to-dark dynamic range to the destination light-to-dark dynamic range further comprises:
adjusting the colors of the first representation of the image to create the second representation of the image such that pixels of the first representation of the image corresponding to the source intermediate point are adjusted to the destination intermediate point in the second representation of the image.

12. A computing device comprising:
a processor;
data storage; and
program instructions, stored in the data storage, that, upon execution by the processor, cause the computing device to perform operations comprising:
obtaining a source light-to-dark dynamic range of a first output medium, wherein the source light-to-dark dynamic range comprises a source white point and a source black point;
obtaining a destination light-to-dark dynamic range of a second output medium, wherein the destination light-to-dark dynamic range comprises a destination white point and a destination black point;
determining a white point mapping using the source white point and the destination white point, and a black point mapping using the source black point and the destination black point;
based on a first representation of an image that has been displayed on the first output medium, creating a second representation of the image by interpolating the source light-to-dark dynamic range to the destination light-to-dark dynamic range based on the white point mapping and the black point mapping; and
causing the second output medium to produce the second representation of the image using the destination light-to-dark dynamic range,
wherein interpolating the source light-to-dark dynamic range to the destination light-to-dark dynamic range based on the white point mapping and the black point mapping further comprises:
determining the source light-to-dark dynamic range and the destination light-to-dark dynamic range within a XYZ tristimulus model;
based on the XYZ tristimulus model, determining the source light-to-dark dynamic range and the destination light-to-dark dynamic range in a cone space model, wherein the cone space model represents colors based in part on responses from photoreceptors in a human eye; and
adjusting the source light-to-dark dynamic range based in part on: (i) the destination light-to-dark dynamic range, (ii) the source white point, and (iii) the destination white point within the cone space model,
wherein adjusting the source light-to-dark dynamic range further comprises approximating LMS colors based in part on the source white point and the source black point in the cone space model and the destination white point and the destination black point in the cone space model, wherein approximating the LMS colors further comprises:
determining $L_{dest}$, wherein $L_{dest}=[(L'_{src}-L'_{B,src})/(L'_{W,src}-L'_{B,src})](L_{W,dest}-L_{B,dest})+L_{B,dest}$, wherein $L'_{src}=L_{src}(L_{W,dest}/L_{W,src})$, $L_{src}$ is a long-wavelength-source cone space response, $L_{W,src}$ is a long-wavelength-source-white-point cone space response, $L_{dest}$ is a long-wavelength-destination cone space response, $L'_{src}$ is a long-wavelength-source-adapted cone space response, $L'_{B,src}$ is a long-wavelength-source-black-point-adapted cone space response, $L'_{W,src}$ is a long-wavelength-source-white-point-adapted cone space response, $L_{W,dest}$ is a long-wavelength-destination-white-point cone space response, and $L_{B,dest}$ is a long-wavelength-destination-black-point cone space response;
determining $M_{dest}$, wherein $M_{dest}=[(M'_{src}-M'_{B,src})/(M'_{W,src}-M'_{B,src})](M_{W,dest}-M_{B,dest})+M_{B,dest}$, wherein $M'_{src}=M_{src}(M_{W,dest}/M_{W,src})$, $M_{src}$ is a medium-wavelength-source cone space response, $M_{W,src}$ is a medium-wavelength-source-white-point cone space response, $M_{dest}$ is a medium wavelength-destination cone space response, $M'_{src}$ is a medium-wavelength-source-adapted cone space response, $M'_{B,src}$ is a medium-wavelength-source-black-point-adapted cone space response, $M'_{W,src}$ is a medium-wavelength-source-white-point-adapted cone space response, $M_{W,dest}$ is a medium-wavelength-destination-white-point cone space response, and $M_{B,dest}$ is a medium-wavelength-destination-black-point cone space response; and
determining $S_{dest}$, wherein $S_{dest}=[(S'_{src}-S'_{B,src})/(S'_{W,src}-S'_{B,src})](S_{W,dest}-S_{B,dest})+S_{B,dest}$, wherein $S'_{src}=S_{src}(S_{W,dest}/S_{W,src})$, $S_{src}$ is a short-wavelength-source cone space response, $S_{W,src}$ is a short-wavelength-source-white-point cone space response, $S_{dest}$ is a short-wavelength-destination cone space response, $S'_{src}$ is a short-wavelength-source-adapted cone space response, $S'_{B,src}$ is a short-wavelength-source-black-point-adapted cone space response, $S'_{W,src}$ is a short-wavelength-source-white-point-adapted cone space response, $S_{W,dest}$ is a short-wavelength-destination-whitepoint cone space response, and $S_{B,dest}$ is a short-wavelength-destination-black-point cone space response.

13. The computing device from claim 12, wherein creating the second representation of the image by interpolating the source light-to-dark dynamic range to the destination light-to-dark dynamic range comprises:
adjusting the colors of the first representation of the image to create the second representation of the image such that pixels of the first representation of the image corresponding to the source white point are adjusted to the destination white point in second the representation of the image, and pixels of the first representation of the image corresponding to the source black point are adjusted to the destination black point in the second representation of the image.

14. The computing device from claim 13, wherein interpolating the source light-to-dark dynamic range to the destination light-to-dark dynamic range comprises determining an intermediate point mapping between a source intermediate point of the source light-to-dark dynamic range and a destination intermediate point of the destination light-to-dark dynamic range, and wherein creating the second representation of the image by interpolating the source light-to-dark dynamic range to the destination light-to-dark dynamic range further comprises:
adjusting the colors of the first representation of the image to create the second representation of the image such that pixels of the first representation of the image corresponding to the source intermediate point are adjusted to the destination intermediate point in the second representation of the image.

* * * * *